United States Patent
Yang et al.

(10) Patent No.: US 8,514,956 B2
(45) Date of Patent: Aug. 20, 2013

(54) METHOD AND APPARATUS FOR FACILITATING TRI-STATE DECODING ON A SHARED UPLINK CHANNEL

(75) Inventors: Lin Yang, San Diego, CA (US); Hao Xu, San Diego, CA (US); Renqiu Wang, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 12/780,808

(22) Filed: May 14, 2010

(65) Prior Publication Data

US 2011/0280346 A1 Nov. 17, 2011

(51) Int. Cl.
*H04K 1/10* (2006.01)
*H04L 27/28* (2006.01)

(52) U.S. Cl.
USPC ........... 375/260; 375/343; 375/340; 375/341; 375/262; 375/346; 370/329; 370/203

(58) Field of Classification Search
USPC ................. 375/340, 341, 343, 346, 259, 260, 375/262; 370/329, 203
See application file for complete search history.

(56) References Cited

U.S. PATENT DOCUMENTS

| | | | |
|---|---|---|---|
| 8,102,802 B2* | 1/2012 | Ratasuk et al. | 370/329 |
| 2005/0286402 A1* | 12/2005 | Byun et al. | 370/203 |

FOREIGN PATENT DOCUMENTS

| | | |
|---|---|---|
| EP | 2180621 A1 | 4/2010 |
| WO | WO9826619 A2 | 6/1998 |
| WO | WO2007021591 A2 | 2/2007 |
| WO | WO2008082120 A1 | 7/2008 |

OTHER PUBLICATIONS

International Search Report and Written Opinion—PCT/US2011/036494—ISA/EPO—Jul. 25, 2011.
"3rd Generation Partnership Project; Technical Specification Group Radio Access Network; Evolved Universal Terrestrial Radio Access (E-UTRA); Physical Channels and Modulation" (Release 8), 3GPP TS 36.211 V8.3.0 (May 2008).
"3rd Generation Partnership Project; Technical Specification Group Radio Access Network; Evolved Universal Terrestrial Radio Access (E-UTRA); Multiplexing and channel coding" (Release 8), 3GPP TS 36.212 V8.3.0 (May 2008).

* cited by examiner

Primary Examiner — Phuong Phu

(57) ABSTRACT

Methods, apparatuses, and computer program products are disclosed for facilitating decoding a communication received from a wireless terminal. Encoded bits are received from the wireless terminal via a shared uplink channel, and a plurality of acknowledgment tones are identified within the encoded bits. A correlation value is ascertained corresponding to a correlation between detected bits within the plurality of acknowledgment tones and valid bits corresponding to any of a plurality of valid acknowledgment codewords. A determination is then made as to whether the plurality of acknowledgment tones includes information corresponding to a discontinuous transmission by comparing the correlation value to a threshold value.

20 Claims, 11 Drawing Sheets

METHOD AND APPARATUS FOR FACILITATING TRI-STATE DECODING ON A SHARED UPLINK CHANNEL

BACKGROUND

I. Field

The following description relates generally to wireless communications, and more particularly to methods and apparatuses for facilitating tri-state decoding on a shared uplink channel.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In designing a reliable wireless communication system, special attention must be given with respect to decoding uplink transmissions. For instance, in the current LTE specification (3GPP TS 36.212: "Evolved Universal Terrestrial Radio Access (E-UTRA); Multiplexing and Channel Coding") which is herein incorporated by reference, uplink transmissions use a single carrier waveform. When there is no data transmission, uplink control information including uplink acknowledgment (ACK) symbols are transmitted via the physical uplink control channel (PUCCH). On the other hand, when data and control transmissions coexist in one subframe, they are transmitted via the physical uplink shared channel (PUSCH). Here, because a wireless terminal will occasionally miss a physical downlink control channel (PDCCH) assignment, a base station receiving a PUSCH transmission must ascertain whether the transmission includes control information (i.e., an ACK or negative acknowledgment (NAK)) in response to receiving the PDCCH assignment, or whether the transmission includes random data corresponding to a discontinuous transmission (DTX) because the wireless terminal missed the PDCCH assignment. Current PUSCH decoding techniques, however, are inadequate for detecting whether a PUSCH transmission includes data corresponding to a DTX. Accordingly, it would be desirable to develop a method and apparatus for efficiently performing tri-state decoding on a shared uplink channel that carries control and data transmissions.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating tri-state decoding of a shared uplink channel. In one aspect, methods and computer program products are disclosed. Within such embodiments, a plurality of encoded bits are received from a wireless terminal via a shared uplink channel. A plurality of acknowledgment tones are then identified within the plurality of encoded bits. These embodiments further include ascertaining a correlation value corresponding to a correlation between detected bits within the plurality of acknowledgment tones and valid bits corresponding to any of a plurality of valid acknowledgment codewords. A determination is then made as to whether the plurality of acknowledgment tones includes information corresponding to a discontinuous transmission by comparing the correlation value to a threshold value.

In another aspect, an apparatus for facilitating decoding a communication received from a wireless terminal is disclosed. Within such embodiment, the apparatus includes a processor configured to execute computer executable components stored in memory. The computer executable components include a receiving component, a correlation component, and a decoding component. The receiving component is configured to receive a plurality of encoded bits via a shared uplink channel in which the plurality of encoded bits include a plurality of acknowledgment tones. The correlation component configured to ascertain a correlation value corresponding to a correlation between detected bits within the plurality of acknowledgment tones and valid bits corresponding to any of a plurality of valid acknowledgment codewords. The decoding component is configured to detect a discontinuous transmission within the plurality of acknowledgment tones by comparing the correlation value to a threshold value.

In a further aspect, another apparatus for facilitating decoding a communication received from a wireless terminal is disclosed. Within such embodiment, a means for receiving a plurality of encoded bits via a shared uplink channel is provided. The apparatus also includes a means for identifying a plurality of acknowledgment tones within the plurality of encoded bits. Means for ascertaining a correlation value are also provided in which the correlation value corresponds to a correlation between detected bits within the plurality of acknowledgment tones and valid bits corresponding to any of a plurality of valid acknowledgment codewords. The apparatus further includes a means for determining whether the plurality of acknowledgment tones includes information corresponding to a discontinuous transmission by comparing the correlation value to a threshold value To the accomplishment of the foregoing and related ends, the one or more embodiments comprise the features hereinafter fully described and particularly pointed out in the claims The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
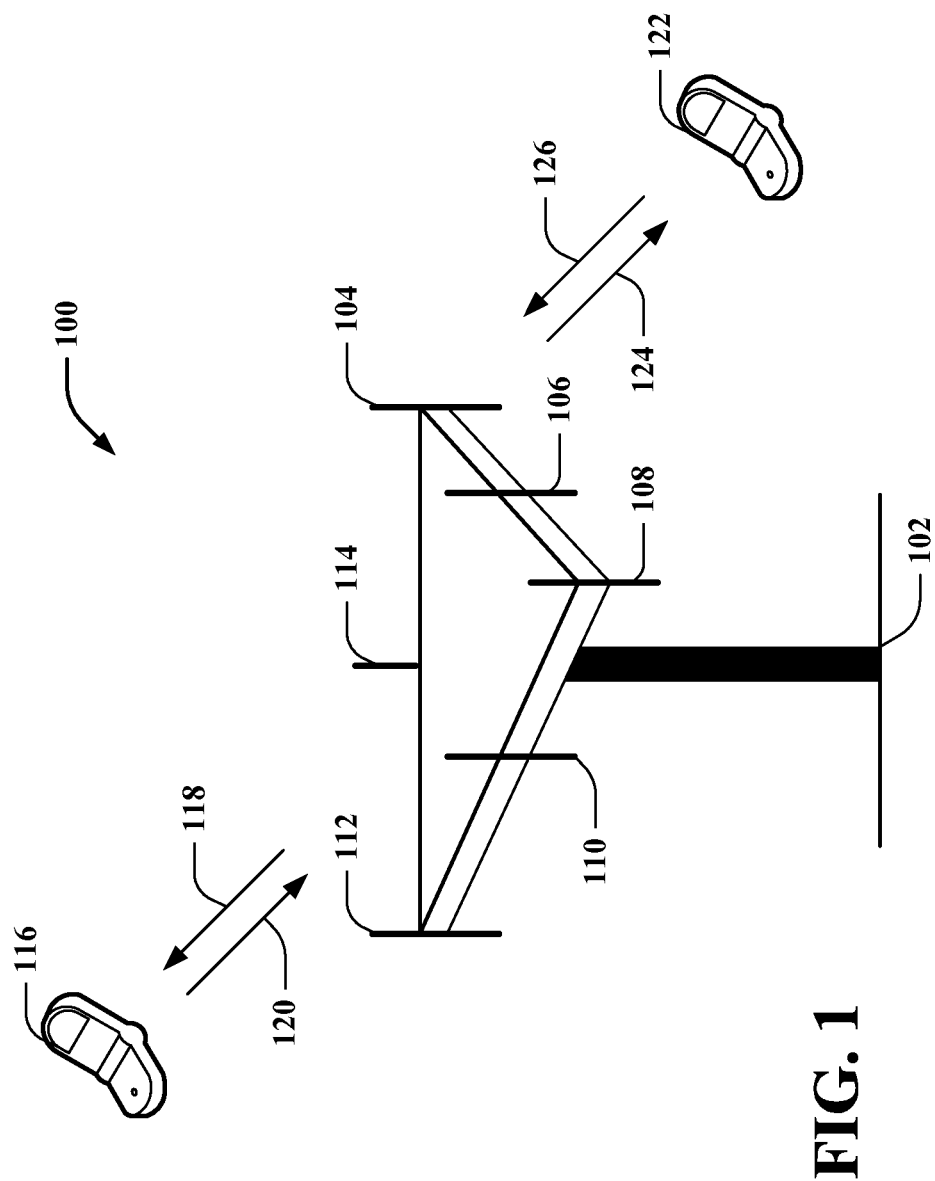
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
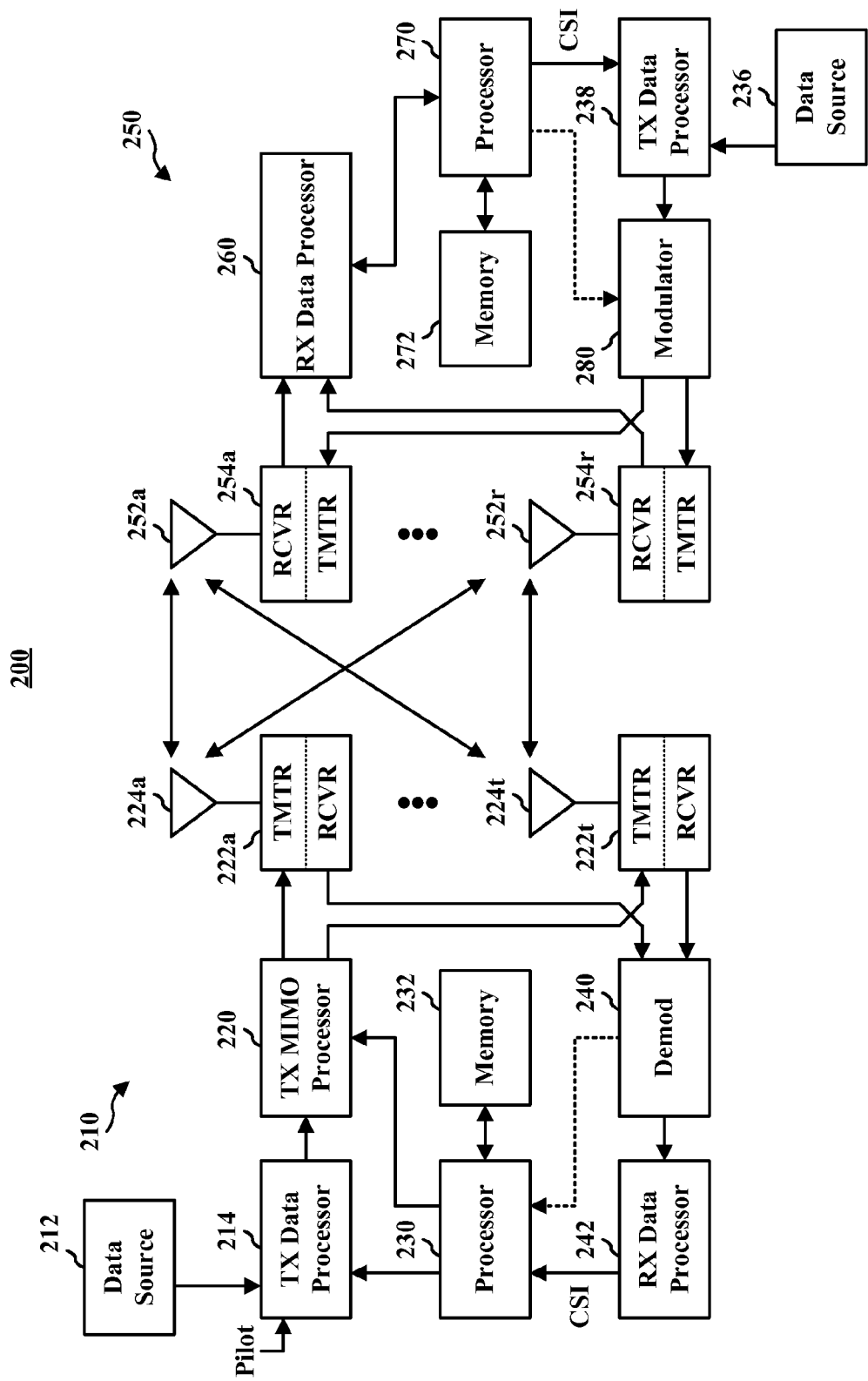
FIG. 2 is an illustration of an example wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
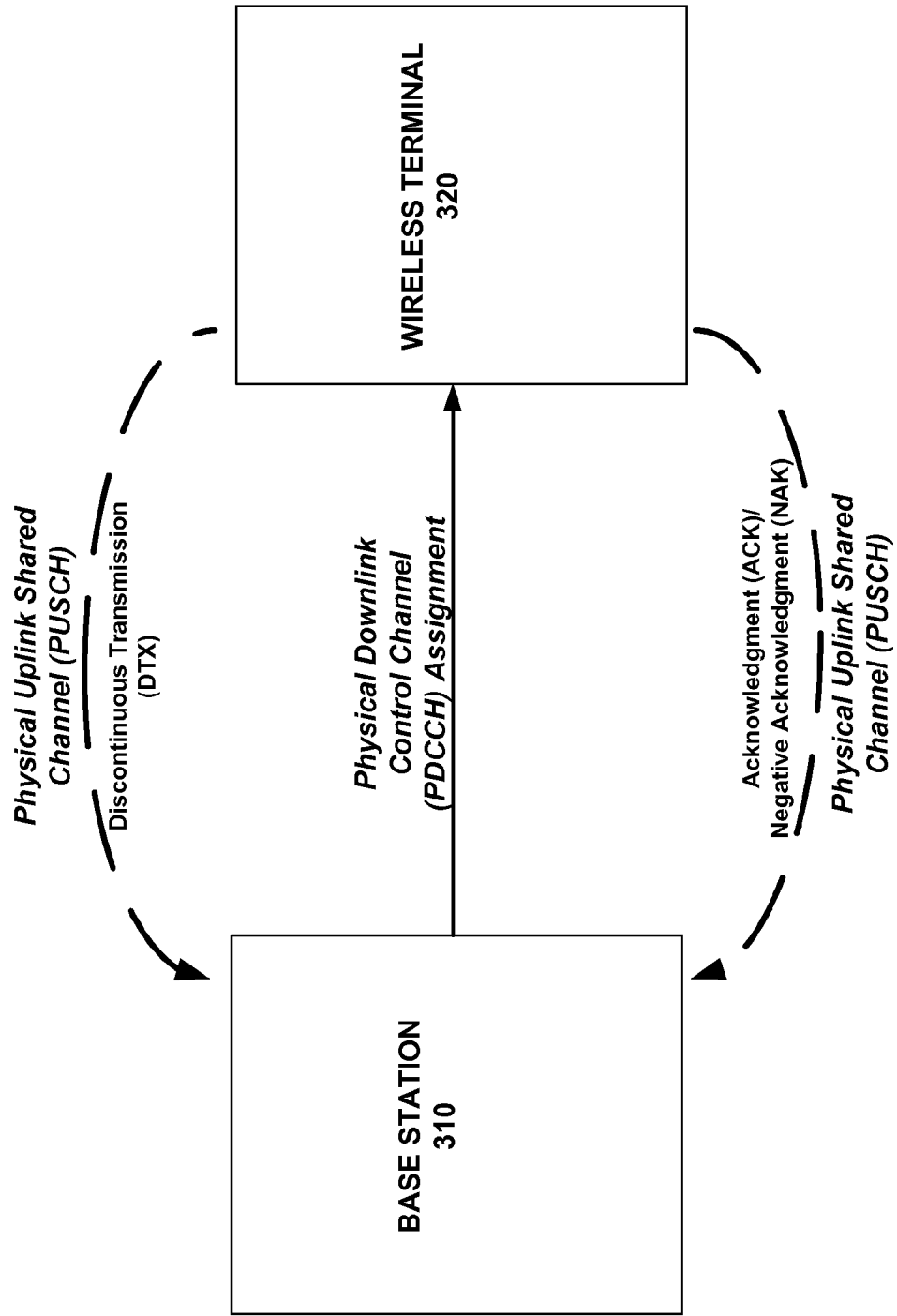
FIG. 3 illustrates an exemplary system for facilitating tri-state decoding on a shared uplink channel in accordance with some aspects.

Referring next to FIG. 3, an exemplary system is provided in which a base station 310 communicates with a wireless terminal As illustrated, when a base station 310 transmits a physical downlink control channel (PDCCH) assignment to a wireless terminal 320, the base station may subsequently receive acknowledgment (ACK) tones via a physical uplink shared channel (PUSCH) that include either control information (i.e., ACK or negative ACK (NAK) information) or random data (i.e., corresponding to a discontinuous transmission (DTX)). A receiver must, therefore, perform a tri-state decoding to determine whether an ACK, NAK, or DTX is included in the ACK tones received via PUSCH.

Figure 4:
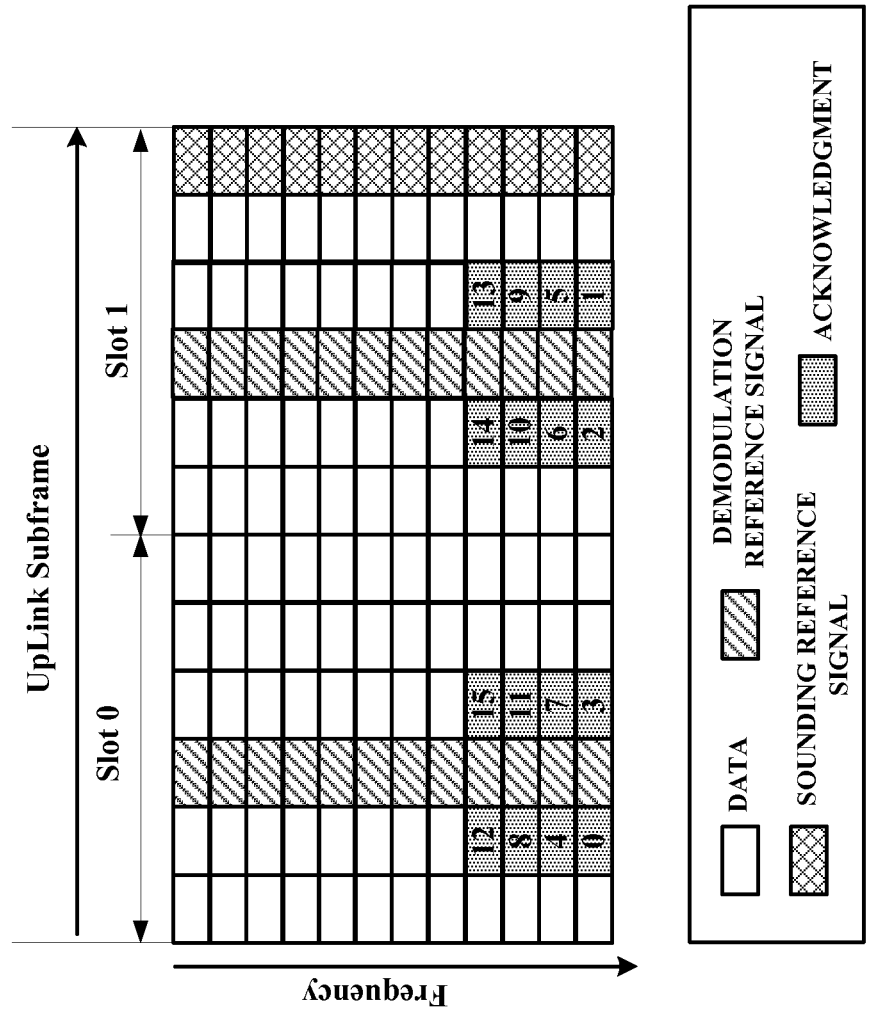
FIG. 4 illustrates an exemplary frame structure of a physical uplink shared channel (PUSCH).

Referring next to FIG. 4, an exemplary frame structure of PUSCH when data and ACK are present simultaneously is provided. As illustrated, after ACK symbols are mapped to the four corners of constellations, they are repeatedly allocated on four OFDM symbols on both sides of the two reference signal symbols, from high frequency to low frequency in the order that is illustrated in FIG. 4 and thus occupying a certain number of tones. The data tones corresponding to ACK transmission are punctured. When a wireless terminal misses the PDCCH assignment, however, it will not transmit ACK symbols (i.e., normal data transmission occurs). In this case, the eNB receiver will thus have to perform tri-state decoding to discern whether ACK or NACK is transmitted or random data is transmitted (i.e., DTX). The challenge therefore is to design an effective algorithm for the receiver to do tri-state decoding.

As stated previously, the subject specification discloses a method and apparatus for facilitating tri-state decoding on a shared uplink channel. In particular, the subject specification discloses a method and apparatus for facilitating LTE uplink HARQ-ACK symbol tri-state decoding when transmitted via PUSCH. In addition to detecting ACK/NACK symbols when a wireless terminal receives a PDCCH assignment, the novel aspects described herein also detect DTX when the wireless terminal misses the PDCCH assignment.

Figure 5:
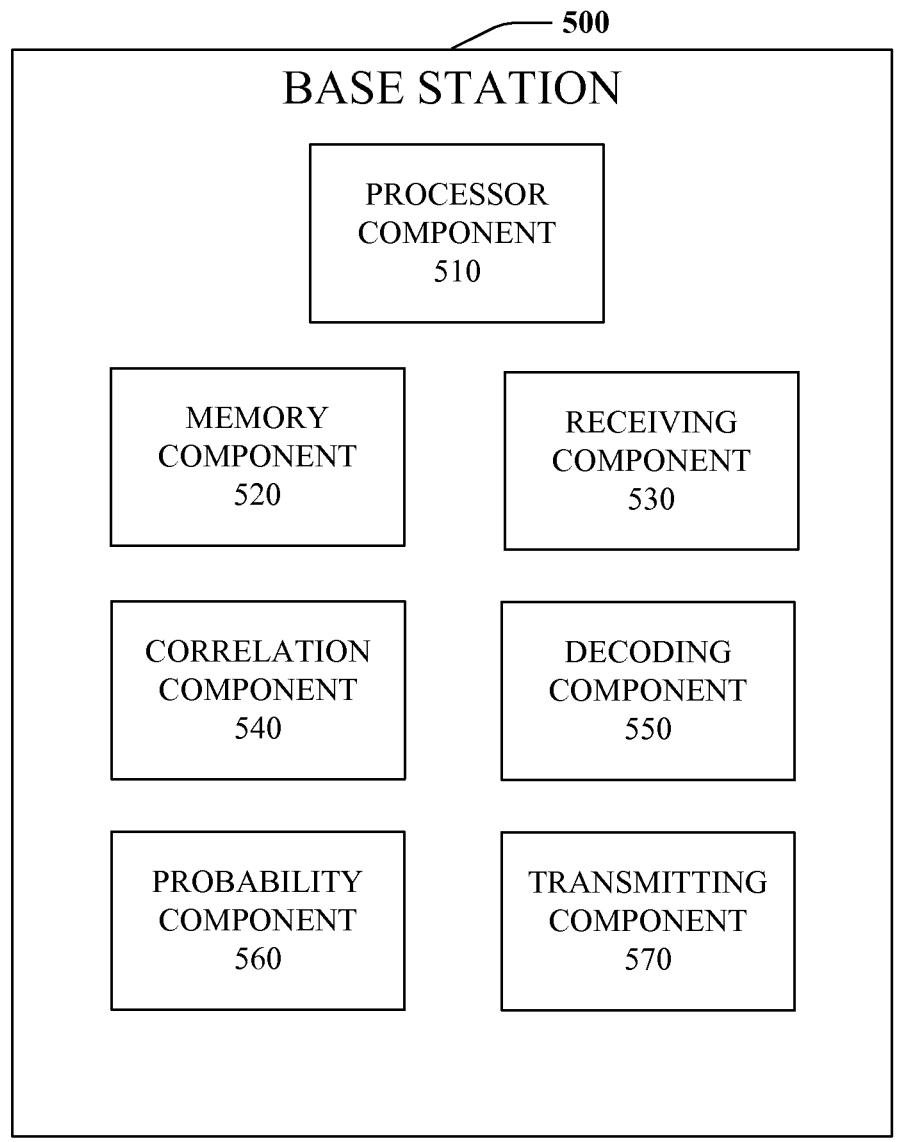
FIG. 5 illustrates a block diagram of an exemplary base station that facilitates tri-state decoding in accordance with an aspect of the subject specification.

Referring next to FIG. 5, a block diagram of an exemplary base station that facilitates decoding a communication received from a wireless terminal is provided. As shown, base station 500 may include processor component 510, memory component 520, receiving component 530, correlation component 540, decoding component 550, probability component 560, and transmitting component 570.

In one aspect, processor component 510 is configured to execute computer-readable instructions related to performing any of a plurality of functions. Processor component 510 can be a single processor or a plurality of processors dedicated to analyzing information to be communicated from base station 500 and/or generating information that can be utilized by memory component 520, receiving component 530, correlation component 540, decoding component 550, probability component 560, and/or transmitting component 570. Additionally or alternatively, processor component 510 may be configured to control one or more components of base station 500.

In another aspect, memory component 520 is coupled to processor component 510 and configured to store computer-readable instructions executed by processor component 510. Memory component 520 may also be configured to store any of a plurality of other types of data including tri-state decoding algorithms, as well as data generated by any of receiving component 530, correlation component 540, decoding component 550, probability component 560, and/or transmitting component 570. Memory component 520 can be configured in a number of different configurations, including as random access memory, battery-backed memory, hard disk, magnetic tape, etc. Various features can also be implemented upon memory component 520, such as compression and automatic back up (e.g., use of a Redundant Array of Independent Drives configuration).

In yet another aspect, receiving component 530 and transmitting component 570 are also coupled to processor component 510 and configured to interface base station 500 with external entities. For instance, receiving component 530 may be configured to receive a plurality of encoded bits including a plurality of acknowledgment tones via a shared uplink channel, whereas transmitting component 570 may be configured to transmit a control channel assignment (e.g., a PDCCH assignment) to a wireless terminal.

As illustrated, base station 500 also includes correlation component 540 and decoding component 550. Within such embodiment, correlation component 540 is configured to ascertain a correlation value representing a correlation between detected bits within the plurality of acknowledgment tones and valid bits corresponding to any of a plurality of valid acknowledgment codewords. Meanwhile, decoding component 550 is configured to detect a discontinuous transmission within the plurality of acknowledgment tones by comparing the correlation value to a threshold value.

Here, it should be noted that the aforementioned correlation value may depend on any of a plurality of parameters. For instance, in an embodiment, correlation component 540 is configured to ascertain an anticipated bit length for an acknowledgment indicator (e.g., 1-bit ACK, 2-bit ACK, etc.), wherein the correlation value is a function of the anticipated bit length. In another embodiment, correlation component 540 is configured to ascertain a modulation order ($Q_m$) for each of the plurality of valid acknowledgment codewords, wherein the correlation value is a function of the modulation order. Correlation component 540 may also be configured to select the correlation value from a plurality of potential correlation values respectively associated with one of the plurality of valid acknowledgment codewords, wherein the correlation value is a maximum of the plurality of potential correlation values.

For some embodiments, base station 500 further includes probability component 560, which is configured to ascertain a log likelihood ratio value for each of the detected bits within the plurality of acknowledgment tones. For these embodiments, correlation component 540 may then ascertain correlation values according to any of a plurality of decoding algorithms that utilize log likelihood ratios ascertained by probability component 560. For instance, correlation component 540 may be configured to ascertain correlation values according to a segmentation algorithm or a non-segmentation algorithm, which both utilize log likelihood ratios.

In an aspect, when implementing a non-segmentation algorithm, probability component 560 is configured to ascertain a plurality of log likelihood ratio values respectively corresponding to information bits within the detected bits. Within such embodiment, correlation component 540 is configured to then ascertain the correlation value as a function of the plurality of log likelihood ratio values. For instance, in an aspect wherein each of the information bits has a corresponding bit location, correlation component 540 is configured to ascertain a plurality of sums respectively corresponding to a summation of log likelihood ratio values associated with a subset of the information bits having a common bit location, wherein the correlation value depends on the plurality of sums. In yet a further aspect, correlation component 540 is configured to ascertain an absolute value for each of the plurality of log likelihood ratio values, wherein decoding component 550 is configured to detect a discontinuous transmission by comparing the correlation value to a sum of the absolute value for each of the plurality of log likelihood ratio values.

In another aspect, when implementing a segmentation algorithm, correlation component 540 is configured to segment each of the plurality of acknowledgment tones into a plurality of segments. Within such embodiment, each of the plurality of segments has a corresponding log likelihood ratio value, wherein correlation component 540 is further configured to ascertain the correlation value as a function of the corresponding log likelihood ratio value for each of the plurality of segments. For instance, in an aspect where each of the plurality of segments has a corresponding segment location, correlation component 540 is configured to ascertain a plurality of sums respectively corresponding to a summation of log likelihood ratio values associated with a subset of the detected bits having a common segment location. Correlation component 540 is then further configured to ascertain the correlation value based on the plurality of sums.

Figure 6:
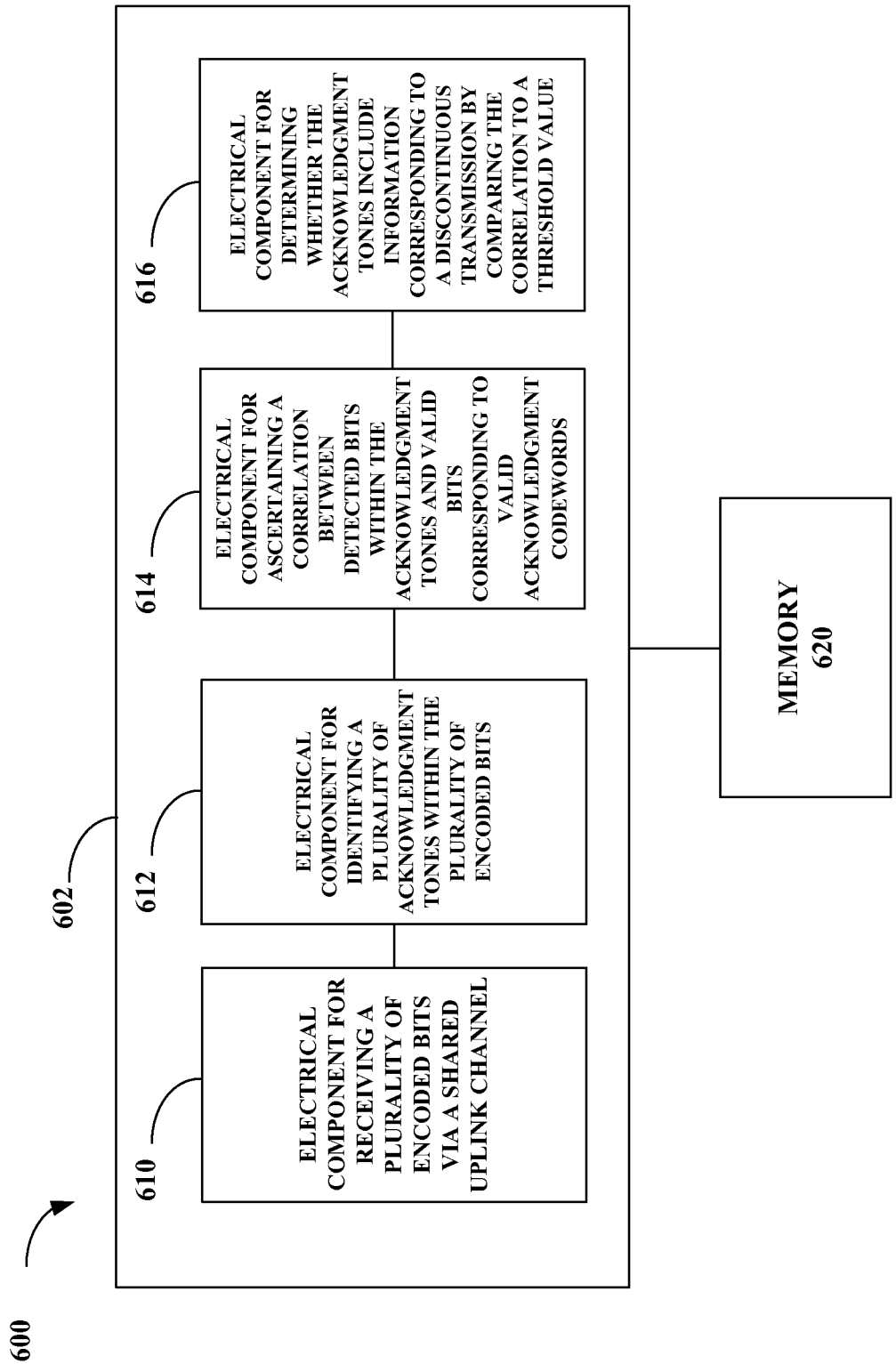
FIG. 6 is an illustration of an exemplary coupling of electrical components that effectuate facilitating tri-state decoding on a shared uplink channel.

Turning to FIG. 6, illustrated is a system 600 that facilitates tri-state decoding on a shared uplink channel. System 600 can reside within a base station, for instance. As depicted, system 600 includes functional blocks that can represent functions implemented by a processor, software, or combination thereof (e.g., firmware). System 600 includes a logical grouping 602 of electrical components that can act in conjunction. As illustrated, logical grouping 602 can include an electrical component for receiving a plurality of encoded bits via a shared uplink channel 610. Logical grouping 602 can also include an electrical component for identifying a plurality of acknowledgment tones within the plurality of encoded bits 612, as well as an electrical component for ascertaining a correlation between detected bits within the acknowledgment tones and valid bits corresponding to valid acknowledgment codewords 614. Furthermore, logical grouping 602 can include an electrical component for determining whether the acknowledgment tones include information corresponding to a discontinuous transmission by comparing the correlation to a threshold value 616. Additionally, system 600 can include a memory 620 that retains instructions for executing functions associated with electrical components 610, 612, 614, and 616. While shown as being external to memory 620, it is to be understood that electrical components 610, 612, 614, and 616 can exist within memory 620.

Figure 7:
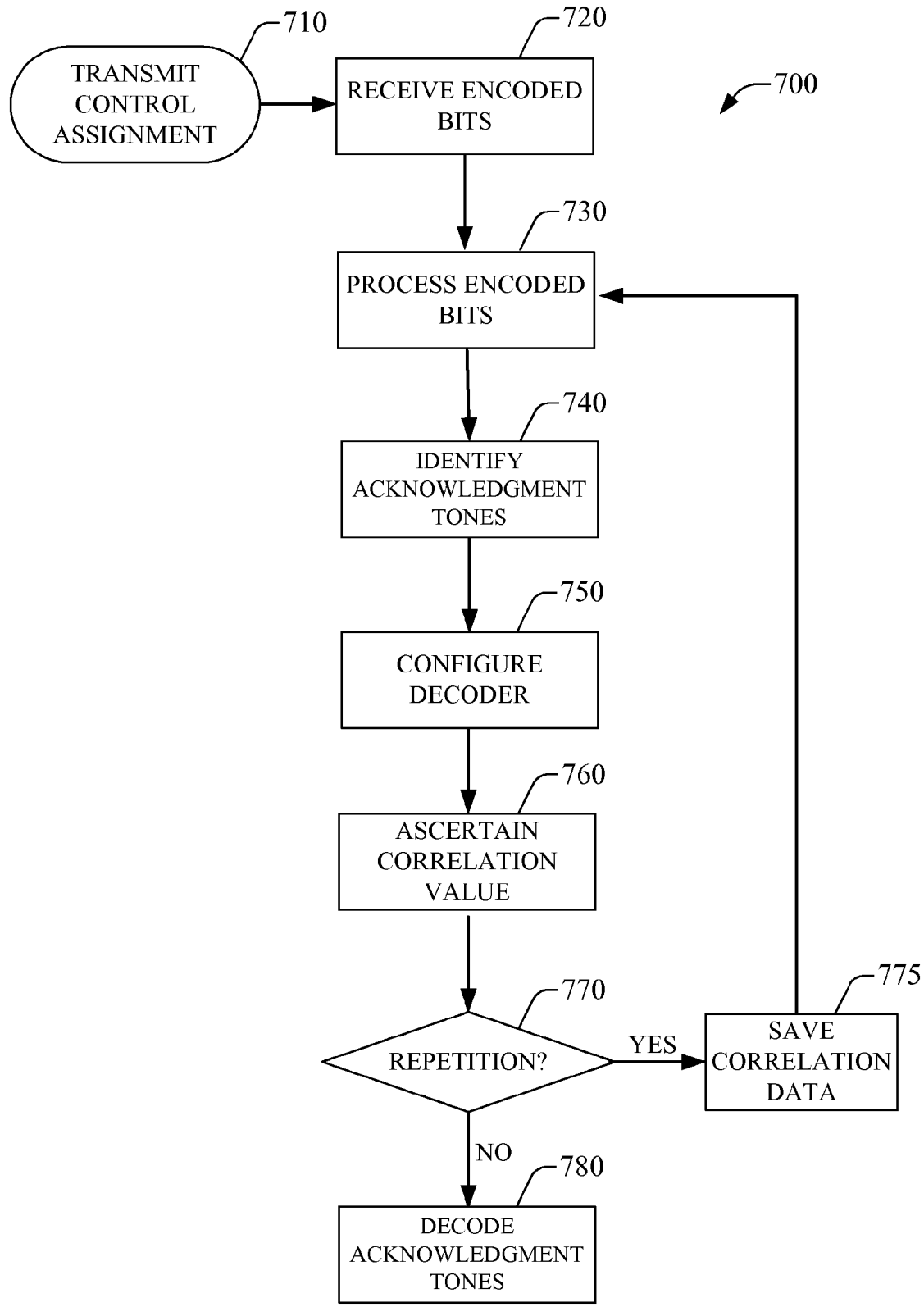
FIG. 7 is a flow chart illustrating an exemplary methodology for facilitating tri-state decoding in accordance with an aspect of the subject specification.

Referring next to FIG. 7, a flow chart illustrating an exemplary method for facilitating decoding a communication received from a wireless terminal is provided. As illustrated, process 700 includes a series of acts that may be performed by a base station that includes a tri-state decoder according to an aspect of the subject specification. For instance, process 700 may be implemented by employing a processor to execute computer executable instructions stored on a computer readable storage medium to implement the series of acts. In another embodiment, a computer-readable storage medium comprising code for implementing the acts of process 700 are contemplated.

In an aspect, process 700 begins by transmitting a control assignment to a wireless terminal at act 710. For instance, such control assignment may be transmitted to the wireless terminal over a physical downlink control channel (PDCCH). Next, at act 720, encoded bits are received from the wireless terminal via a shared uplink channel (e.g., via PUSCH), wherein the encoded bits may include ACK symbols (e.g., an ACK or NAK) or DTX data. Here, since ACK symbols might be transmitted via repetition, the encoded bits may be received via a plurality of transmissions.

Upon receiving the encoded bits, the encoded bits are then processed at act 730. Here, such processing may include ascertaining a log likelihood ratio value for each of the encoded bits. Process 700 then proceeds to act 740 where acknowledgment tones within the encoded bits are identified.

Next, at act 750, the base station's tri-state decoder is configured to decode the acknowledgment tones according to particular parameters/algorithms. For instance, the decoder may be configured to implement either a segmentation or non-segmentation decoding algorithm. Furthermore, the decoder may be configured to decode the acknowledgment tones according to a particular modulation order ($Q_m$) and/or anticipated bit length for the acknowledgment indicator (e.g., 1-bit ACK, 2-bit ACK, etc.).

Once configured, the tri-state decoder may then ascertain the appropriate correlation values at act 760. Namely, a correlation value is ascertained which corresponds to a correlation between detected bits within the acknowledgment tones and valid bits corresponding to any of a plurality of valid acknowledgment codewords. In an aspect, act 760 includes selecting the correlation value from a plurality of potential correlation values respectively associated with one of the plurality of valid acknowledgment codewords, wherein the correlation value is a maximum of the plurality of potential correlation values. As stated previously, the correlation value may also vary depending on the particular decoding algorithm. For instance, when segmenting the acknowledgment tones into a plurality of segments according to a segmentation algorithm, the correlation value can be based on a corresponding log likelihood ratio value for each of the plurality of segments (wherein each of the plurality of segments has a corresponding segment location). Similarly, when implementing a non-segmentation algorithm where only information bits within the acknowledgment tones are utilized, the correlation value can be based on a corresponding log likelihood ratio value for each of the information bits (wherein each of the information bits has a corresponding bit location).

Next, at act 770, the tri-state decoder determines whether the encoded bits correspond to an ACK repetition sequence. If an ACK repetition sequence is indeed detected, process 700 proceeds to step 775 where the current correlation data is saved (e.g., a correlation metric for ascertaining a correlation value corresponding to an i-th transmission), and where process 700 loops back to act 730 to process encoded bits received from a subsequent transmission.

However, if an ACK repetition sequence is not detected at act 770, process 700 concludes at act 780 where the acknowledgment tones are decoded. Namely, act 780 determines whether the acknowledgment tones include information corresponding to a discontinuous transmission by comparing the correlation value to a threshold value.

Exemplary Encoding Techiniques

In the discussion that follows, exemplary encoding techniques compatible with various decoding aspects described herein are provided. It should, however, be appreciated that these examples are provided for illustrative purposes only, and that any of various encoding techniques compatible with the decoding aspects described herein may be contemplated.

In an aspect, the decoding aspects described herein can be utilized to decode PUSCH transmissions encoded according to the current LTE specification. Namely, as described in the LTE specification regarding how HARQ-ACK is encoded, mapped, and transmitted on PUSCH, the following encoding technique may be utilized:

If HARQ-ACK consists of 1-bit of information, i.e., $[o_0^{ACK}]$, it is first encoded according to Table 1.

If HARQ-ACK consists of 2-bits of information, i.e., $[o_0^{ACK} o_1^{ACK}]$, it is first encoded according to Table 2 where $o_2^{ACK} = (o_0^{ACK} \oplus o_1^{ACK})$ and where '$\oplus$' represents XOR operation.

TABLE 1

Encoding of 1-bit HARQ-ACK

| $Q_m$ | Encoded HARQ-ACK |
|---|---|
| 2 | $[o_0^{ACK} x]$ |
| 4 | $[o_0^{ACK} x x x]$ |
| 6 | $[o_0^{ACK} x x x x x]$ |

TABLE 2

Encoding of 2-bit HARQ-ACK

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x x o_2^{ACK} o_0^{ACK} x x o_1^{ACK} o_2^{ACK} x x]$ |
| 6 | $[o_0^{ACK} o_1^{ACK} x x x x o_2^{ACK} o_0^{ACK} x x x x o_1^{ACK} o_2^{ACK} x x x x]$ |

The "x" in Table 1 and 2 are placeholders to scramble the HARQ-ACK bits in a way that maximizes the Euclidean distance of the modulation symbols carrying HARQ-ACK information.

Specifically, the scrambling procedure can be described according to the following:

The block of bits $b(0), \ldots, b(M_{bit}-1)$, where $M_{bit}$ is the number of bits transmitted on the physical uplink shared channel in one subframe, shall be scrambled with a UE-specific scrambling sequence prior to modulation, resulting in a block of scrambled bits $\tilde{b}(0), \ldots, \tilde{b}(M_{bit}-1)$ according to the following pseudo code

```
Set i = 0
If ACK/NAK consists of 2-bits of information:
    while i < M_bit
        if b(i) = x                        // ACK placeholder bits
            b̃(i) = 1
        else                               // Data or channel quality coded bits
                                              or
ACK coded bits
            b̃(i) = (b(i) + c(i))mod 2
        end if
        i = i + 1
    end while
In all other cases:
    while i < M_bit
        if Q_m = 2 and b(i) = x            // ACK placeholder bits with QPSK
                                              modulation
            b̃(i) = b̃(i - 1)
        else if Q_m = 4 and b(i) = x       // ACK placeholder bits with 16QAM
                                              modulation
            b̃(i) = b̃(i - 1)
            b̃(i + 1) = 1
            b̃(i + 2) = 1
            i = i + 2
        else if Q_m = 6 and b(i) = x       // ACK placeholder bits with 64QAM
                                              modulation
            b̃(i) = b̃(i - 1)
            b̃(i + 1) = 1
            b̃(i + 2) = 1
            b̃(i + 3) = 1
            b̃(i + 4) = 1
            i = i + 4
        else
            b̃(i) = (b(i) + c(i))mod 2     // Data or channel quality coded bits
                                              or
ACK coded bits
        end if
        i = i + 1
    end while
```

Note that for 1-bit ACK, the first dummy bit is scrambled to be the same as the info. bit, so it has equal importance as the info. bits for decoding.

The bit sequence $q_0^{ACK}, q_1^{ACK}, q_2^{ACK}, \ldots, q_{Q_{ACK}-1}^{ACK}$ is obtained by concatenation of multiple encoded HARQ-ACK blocks where $Q_{ACK}$ is the total number of coded bit for all the encoded HARQ-ACK blocks. The last concatenation of the encoded HARQ-ACK block may be partial so that the total bit sequence length is equal to $Q_{ACK}$. The vector sequence output of the channel coding for HARQ-ACK information is denoted by $\underline{q}_0^{ACK}, \underline{q}_1^{ACK}, \ldots, \underline{q}_{Q'_{ACK}-1}^{ACK}$, where $Q'_{ACK} = Q_{ACK}/\overline{Q}_m$, and is obtained as follows:

```
Set i , k to 0
while i < Q_ACK
    q_k^ACK = [q_i^ACK ... q_{i + Q_m - 1}^ACK]^T
    i = i + Q_m
    k = k + 1
end while
```

Exemplary Implementations

In the discussion that follows, exemplary implementations for decoding PUSCH transmissions according to various aspects described herein are provided with respect to decoding bits encoded according to the aforementioned LTE specification. It should, however, be appreciated that these examples are provided for illustrative purposes only, and that any of various implementations may be contemplated within the scope and spirit of the subject specification.

Figure 8:
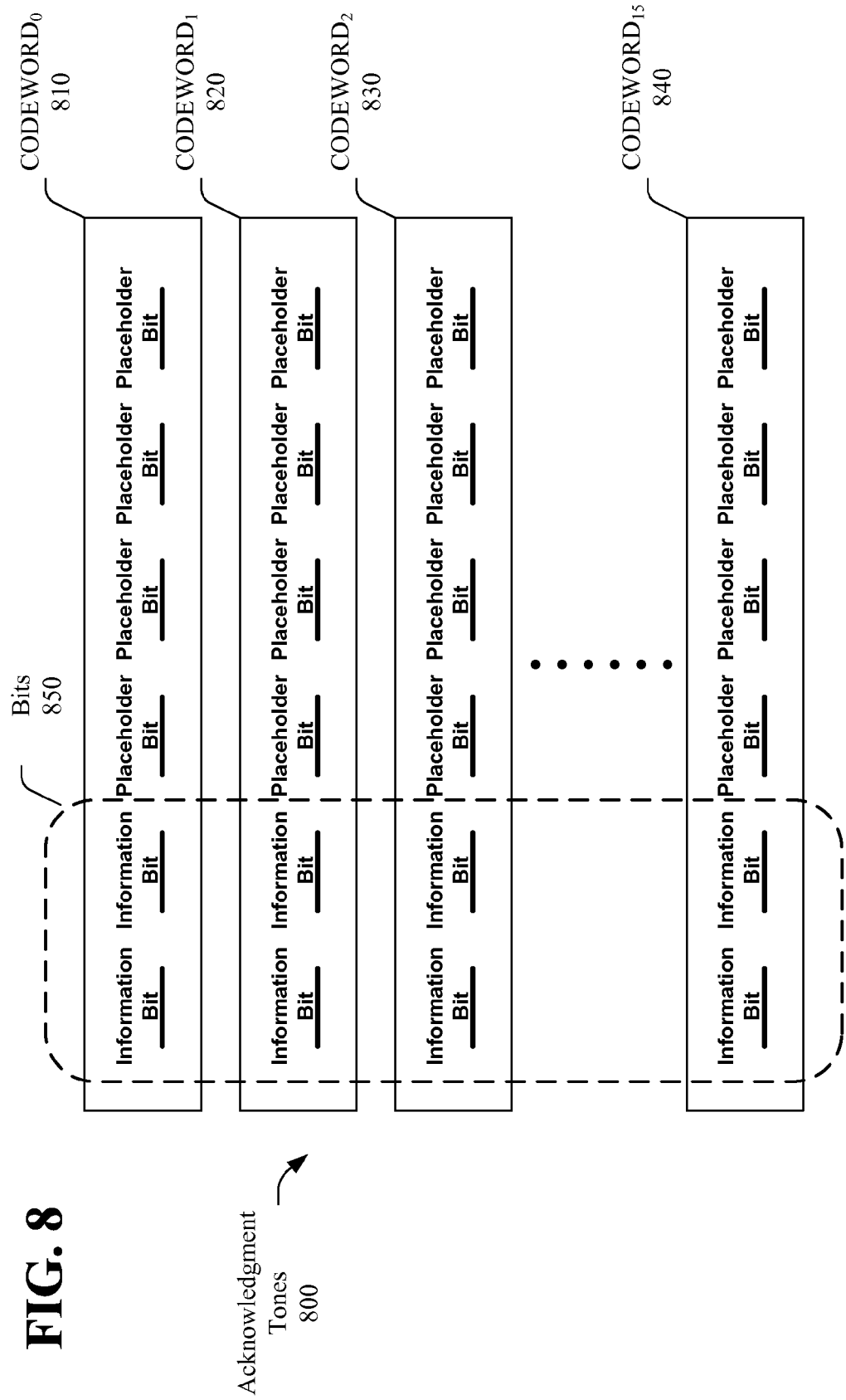
FIG. 8 is a diagram illustrating an exemplary implementation of a non-segmentation algorithm for facilitating tri-state decoding in accordance with some aspects.

At the receiver, one of ordinary skill will appreciate that the processing of data plus control is the same as data only transmissions until the point immediately after log likelihood ratio (LLR) calculations are made. If ACK is configured, LLRs on ACK tones will be passed to an ACK processor, and tri-state decision will be made according to the following non-segmentation procedure. For background, FIG. 8 is provided which illustrates acknowledgment tones 800 transmitted via Codeword$_0$ 810, Codeword$_1$ 820, Codeword$_2$ 830, and Codeword$_{15}$ 840, each having information bits 850. For this particular example, a 1-bit ACK is assumed wherein the modulation order ($Q_m$) is six.

First, the ACK processor goes through the received ACK LLRs ($l_1, l_2, \ldots, l_N$, where N is the number of LLRs) and adds all LLRs corresponding to ACK info bit $o_i^{ACK}$ together as $$L_i = \sum_{k \in o_i^{ACK}} l_k$$

and the absolute value of LLRs corresponding to any ACK info bit $o_i^{ACK}$ (i=0,1,2) together as $$\lambda = \sum_{k \in o_i^{ACK}(i=0,1,2)} |l_k|.$$

Next, the ACK processor calculates the "information bits only" codeword LLR (correlation)

$$S_j = \sum_{i=1}^{Lc} L_i c_{j,i},$$

where $L_C$ is the length of each codeword for decoding. The ACK processor then finds the maximum "information bits only" codeword LLR over all codewords as $\hat{S}=\arg\max(S_1, S_2, \ldots S_{Nc})$, and the corresponding detected codeword $\hat{c}$, where $N_c$ denotes the number of valid decoding codewords (see e.g., Tables 3 and 4).

TABLE 3

"Information Bits Only" codewords for 1-bit HARQ-ACK

| $Q_m$ | Encoded info bits only HARQ-ACK | | | |
|---|---|---|---|---|
| 2 | [1, 1] [−1, −1] | or | [1] [−1] | |
| 4 | [1, 1] [−1, −1] | or | [1] [−1] | |
| 6 | [1, 1] [−1, −1] | or | [1] [−1] | |

TABLE 4

"Information Bits Only" codewords for 2-bit HARQ-ACK

| Qm | Encoded info bits only HARQ-ACK |
|---|---|
| 2 | [1, 1, 1] |
| | [1, −1, −1] |
| | [−1, 1, −1] |
| | [−1, −1, 1] |
| 4 | [1, 1, 1] |
| | [1, −1, −1] |
| | [−1, 1, −1] |
| | [−1, −1, 1] |
| 6 | [1, 1, 1] |

TABLE 4-continued

"Information Bits Only" codewords for 2-bit HARQ-ACK

| Qm | Encoded info bits only HARQ-ACK |
|---|---|
| | [1, −1, −1] |
| | [−1, 1, −1] |
| | [−1, −1, 1] |

As illustrated respectively in Tables 3 and 4, there are two valid codewords (c1, c2) for a 1-bit ACK, whereas there are four valid codewords (c1, c2, c3, c4) for a 2-bit ACK. The valid codewords are given in +/−1 form for different PUSCH modulation orders (Qm). As mentioned previously, for a 1-bit ACK the second bit (or the first dummy bit 'x') which is the copied bit from the information bit is considered an information bit in the decoding, which should also be included when calculating the LLR sum $L_i$ for each information bit. While for a 2-bit ACK, the information bits only decoding codewords include both information bits [$o_0^{ACK} o_1^{ACK}$] and parity bit $o_2^{ACK}$. These codewords may be pre-stored in memories. It should, however, be noted that regardless of the modulation order, the information bits only codewords used for decoding are always the same for any given ACK payload size.

If there is no ACK repetition, a decoding decision can be made directly by comparing $$\frac{\hat{S}}{\lambda}$$

with a decoding threshold γ. If $$\frac{\hat{S}}{\lambda} < \gamma,$$

a DTX can be declared, otherwise, the first one or two bits corresponding to $\hat{c}$ can be deemed ACK/NACK decisions. Here, by letting $\beta=\hat{S}/\lambda/\gamma$ be the decoding metric, this rule can be written as

β<1 ⇒ DTX $\hat{c}_b$<0 ⇒ ACK $\hat{c}_b$>0 ⇒ NACK

The rational behind this decoding algorithm is that if an ACK is indeed transmitted, because of repetition of ACK symbols in the time and frequency domain, the maximum codeword correlation LLR $\hat{S}$ would be very close to the mean LLR norm λ. This is because the decoding codewords are in +/−1 form and the maximum correlation resultant is equivalent to taking the absolute value of the LLRs and summing over, wherein the ratio $\hat{S}/\lambda$ on average will be approximately equal to 1. However, if the UE misses the DL PDCCH assignment, the symbols corresponding to ACK tones will be random data, which will yield a codeword correlation LLR $\hat{S}$ of approximately 0. Therefore, the ratio will be closer to 0 if the PUSCH includes DTX. In view of this property of $\hat{S}/\lambda$, it is desirable to set the decoding threshold γ to be between 0 and 1, and be independent of SNR (standard noise ratio) and number of tones allocated to ACK in the PUSCH frame structure. For instance, decoding threshold γ may be set to 0.4 to maintain the DTX to ACK error rate around $10^{-2}$ required in the LTE specification.

However, if an ACK repetition is configured, the decoding metric and sum LLR for each information bit may be combined with previous transmissions (note: these previous transmissions might come from either PUSCH or PUCCH). Since PUSCH ACK and PUCCH ACK use different decoding algorithms and thresholds, the decoding metric may need to be normalized by the decoding threshold as with β before combining. The combining and decoding can be done by the following steps.

First, the sum LLR for each information bit can be stored for the current (tth) transmission by the following $$L_{t,i} = \sum_{k \in o_i^{ACK}} l_{t,k},$$

whereas the decoding metric can be saved as $\beta_t = \hat{S}_t/\lambda_t/\gamma_t$.

Next, if current transmission is the last transmission, the sum LLRs and decoding metrics can be combined with previous transmissions as $$L_i = \sum_{t=1}^{Nt} L_{t,i} \text{ and } \beta = \sum_{t=1}^{Nt} \beta_t,$$

where Nt is the total number of retransmissions. Here, the information bits only codeword LLR (correlation) can be calculated based on the combined sum LLRs as $$S_j = \sum_{i=1}^{Lc} L_i c_{j,i},$$

and find the maximum information bits only codeword LLR over all codewords as $\hat{S} = \arg\max(S_1, S_2, \ldots S_{Nc})$, and the corresponding detected codeword $\hat{c}$. Decoding can then be based on the following rule:

$\beta < Nt \Rightarrow$ DTX $\hat{C}_b < 0 \Rightarrow$ ACK $\hat{C}_b > 0 \Rightarrow$ NACK The proposed combining algorithm here makes best use of all useful information from each retransmission for tri-state decoding and demonstrates its efficiency in both combining and final decoding.

Exemplary Communication System

Figure 9:
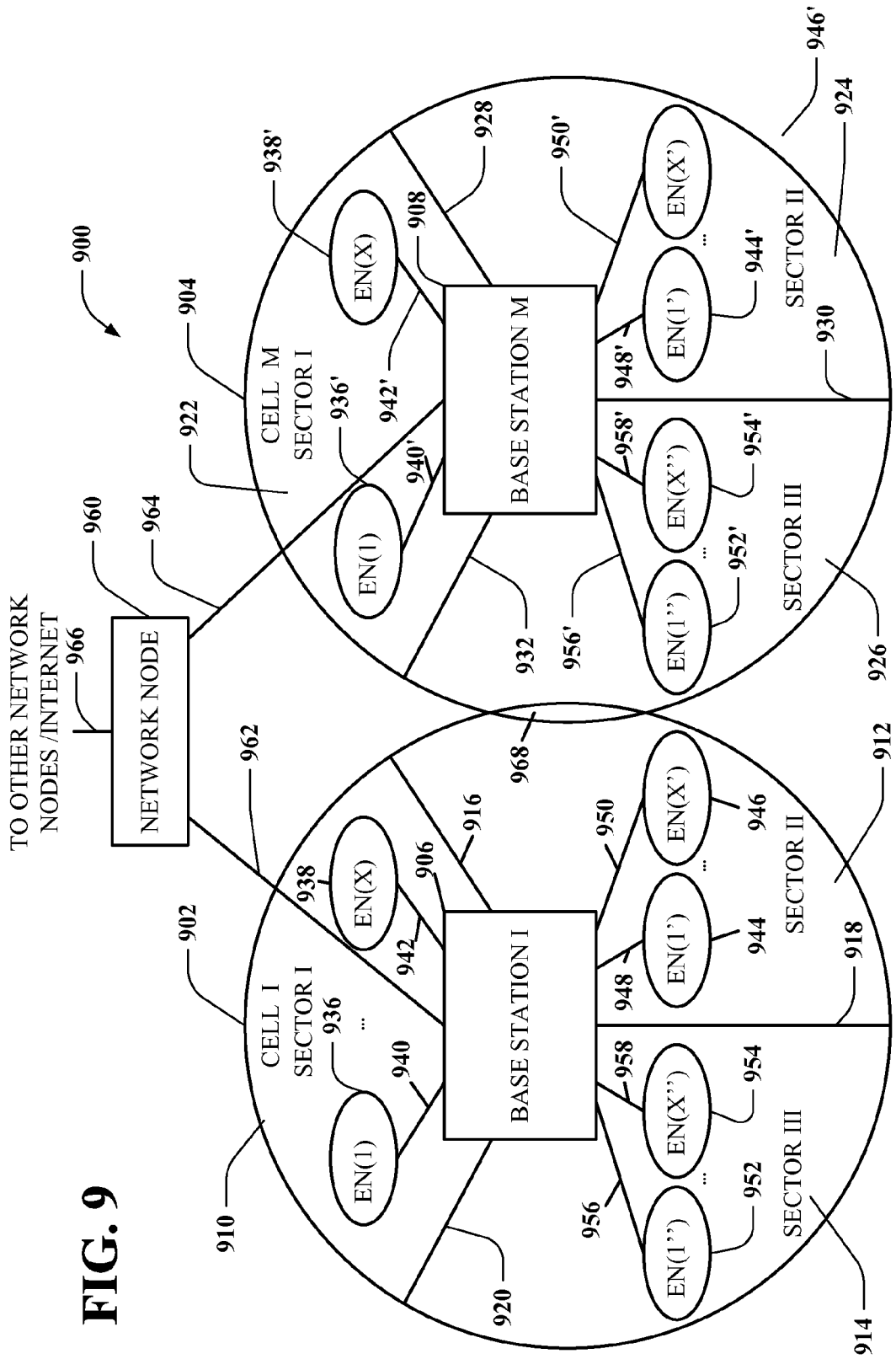
FIG. 9 is an illustration of an exemplary communication system implemented in accordance with various aspects including multiple cells.

Referring next to FIG. 9, an exemplary communication system 900 implemented in accordance with various aspects is provided including multiple cells: cell I 902, cell M 904. Here, it should be noted that neighboring cells 902, 904 overlap slightly, as indicated by cell boundary region 968, thereby creating potential for signal interference between signals transmitted by base stations in neighboring cells. Each cell 902, 904 of system 900 includes three sectors. Cells which have not been subdivided into multiple sectors (N=1), cells with two sectors (N=2) and cells with more than 3 sectors (N>3) are also possible in accordance with various aspects. Cell 902 includes a first sector, sector I 910, a second sector, sector II 912, and a third sector, sector III 914. Each sector 910, 912, 914 has two sector boundary regions; each boundary region is shared between two adjacent sectors.

Sector boundary regions provide potential for signal interference between signals transmitted by base stations in neighboring sectors. Line 916 represents a sector boundary region between sector I 910 and sector II 912; line 918 represents a sector boundary region between sector II 912 and sector III 914; line 920 represents a sector boundary region between sector III 914 and sector I 910. Similarly, cell M 904 includes a first sector, sector I 922, a second sector, sector II 924, and a third sector, sector III 926. Line 928 represents a sector boundary region between sector I 922 and sector II 924; line 930 represents a sector boundary region between sector II 924 and sector III 926; line 932 represents a boundary region between sector III 926 and sector I 922. Cell I 902 includes a base station (BS), base station I 906, and a plurality of end nodes (ENs) in each sector 910, 912, 914. Sector I 910 includes EN(1) 936 and EN(X) 938 coupled to BS 906 via wireless links 940, 942, respectively; sector II 912 includes EN(1') 944 and EN(X') 946 coupled to BS 906 via wireless links 948, 950, respectively; sector III 914 includes EN(1") 952 and EN(X") 954 coupled to BS 906 via wireless links 956, 958, respectively. Similarly, cell M 904 includes base station M 908, and a plurality of end nodes (ENs) in each sector 922, 924, 926. Sector I 922 includes EN(1) 936' and EN(X) 938' coupled to BS M 908 via wireless links 940', 942', respectively; sector II 924 includes EN(1') 944' and EN(X') 946' coupled to BS M 908 via wireless links 948', 950', respectively; sector 3 926 includes EN(1") 952' and EN(X") 954' coupled to BS 908 via wireless links 956', 958', respectively.

System 900 also includes a network node 960 which is coupled to BS I 906 and BS M 908 via network links 962, 964, respectively. Network node 960 is also coupled to other network nodes, e.g., other base stations, AAA server nodes, intermediate nodes, routers, etc. and the Internet via network link 966. Network links 962, 964, 966 may be, e.g., fiber optic cables. Each end node, e.g. EN 1 936 may be a wireless terminal including a transmitter as well as a receiver. The wireless terminals, e.g., EN(1) 936 may move through system 900 and may communicate via wireless links with the base station in the cell in which the EN is currently located. The wireless terminals, (WTs), e.g. EN(1) 936, may communicate with peer nodes, e.g., other WTs in system 900 or outside system 900 via a base station, e.g. BS 906, and/or network node 960. WTs, e.g., EN(1) 936 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 10:
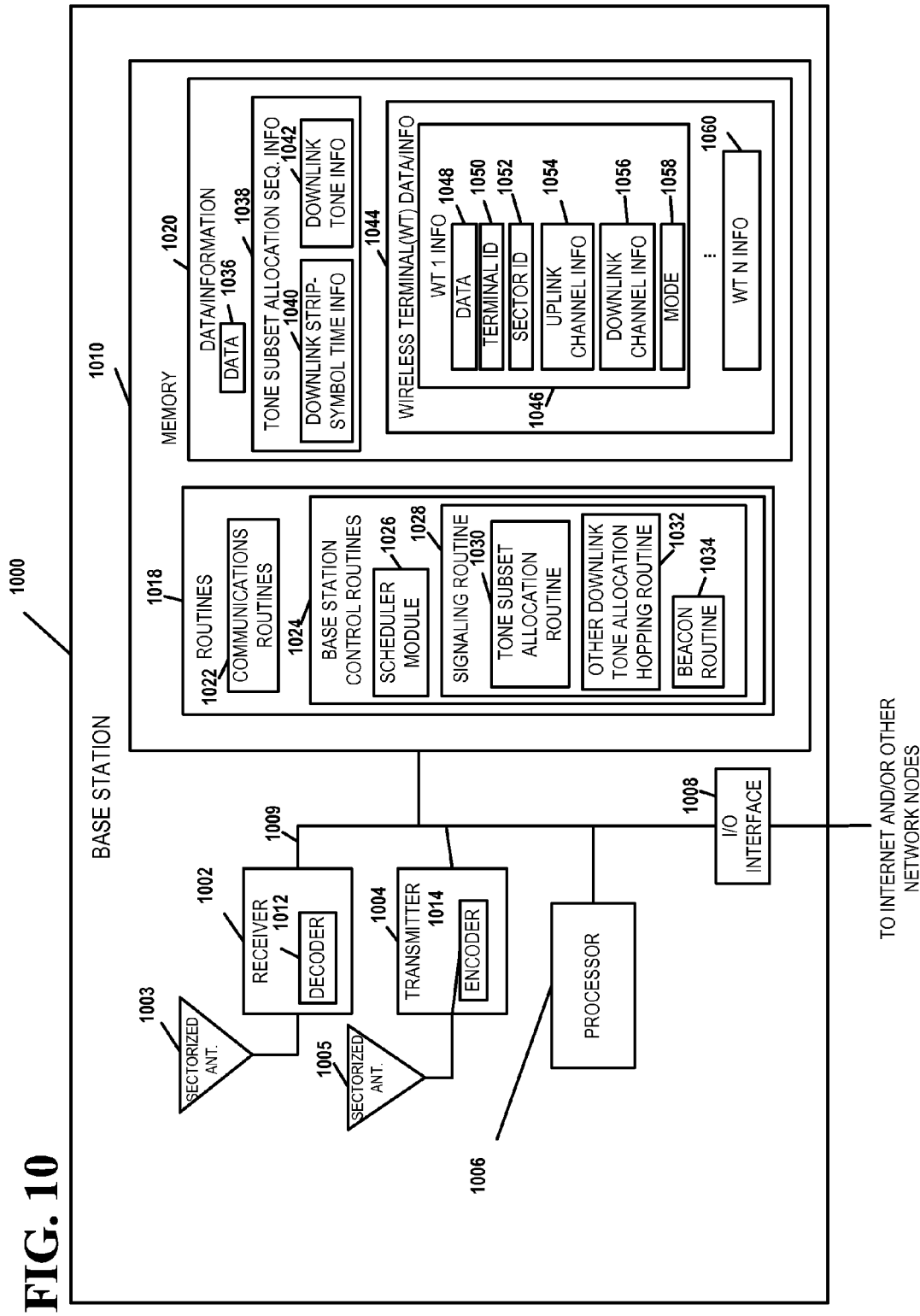
FIG. 10 is an illustration of an exemplary base station in accordance with various aspects described herein.

FIG. 10 illustrates an example base station 1000 in accordance with various aspects. Base station 1000 implements tone subset allocation sequences, with different tone subset allocation sequences generated for respective different sector types of the cell. Base station 1000 may be used as any one of base stations 906, 908 of the system 900 of FIG. 9. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 may interchange data and information.

Sectorized antenna 1003 coupled to receiver 1002 is used for receiving data and other signals, e.g., channel reports, from wireless terminals transmissions from each sector within the base station's cell. Sectorized antenna 1005 coupled to transmitter 1004 is used for transmitting data and other signals, e.g., control signals, pilot signal, beacon signals, etc. to wireless terminals 1100 (see FIG. 11) within each sector of the base station's cell. In various aspects, base station 1000 may employ multiple receivers 1002 and multiple transmitters 1004, e.g., an individual receivers 1002 for each sector and an individual transmitter 1004 for each sector. Processor 1006, may be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 may include data that WT1 1100 has received from a peer node, data that WT 1 1100 desires to be transmitted to a peer node, and downlink channel quality report feedback information. Terminal ID 1050 is a base station 1000 assigned ID that identifies WT 1 1100. Sector ID 1052 includes information identifying the sector in which WT1 1100 is operating. Sector ID 1052 can be used, for example, to determine the sector type. Uplink channel information 1054 includes information identifying channel segments that have been allocated by scheduler 1026 for WT1 1100 to use, e.g., uplink traffic channel segments for data, dedicated uplink control channels for requests, power control, timing control, etc. Each uplink channel assigned to WT1 1100 includes one or more logical tones, each logical tone following an uplink hopping sequence. Downlink channel information 1056 includes information identifying channel segments that have been allocated by scheduler 1026 to carry data and/or information to WT1 1100, e.g., downlink traffic channel segments for user data. Each downlink channel assigned to WT 1 1100 includes one or more logical tones, each following a downlink hopping sequence. Mode information 1058 includes information identifying the state of operation of WT1 1100, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible controlling the generation of transmitted data 1036 and control information. Tone subset allocation routine 1030 constructs the tone subset to be used in a strip-symbol period using the method of the aspect and using data/info 1020 including downlink strip-symbol time info 1040 and sector ID 1052. The downlink tone subset allocation sequences will be different for each sector type in a cell and different for adjacent cells. The WTs 1100 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 11:
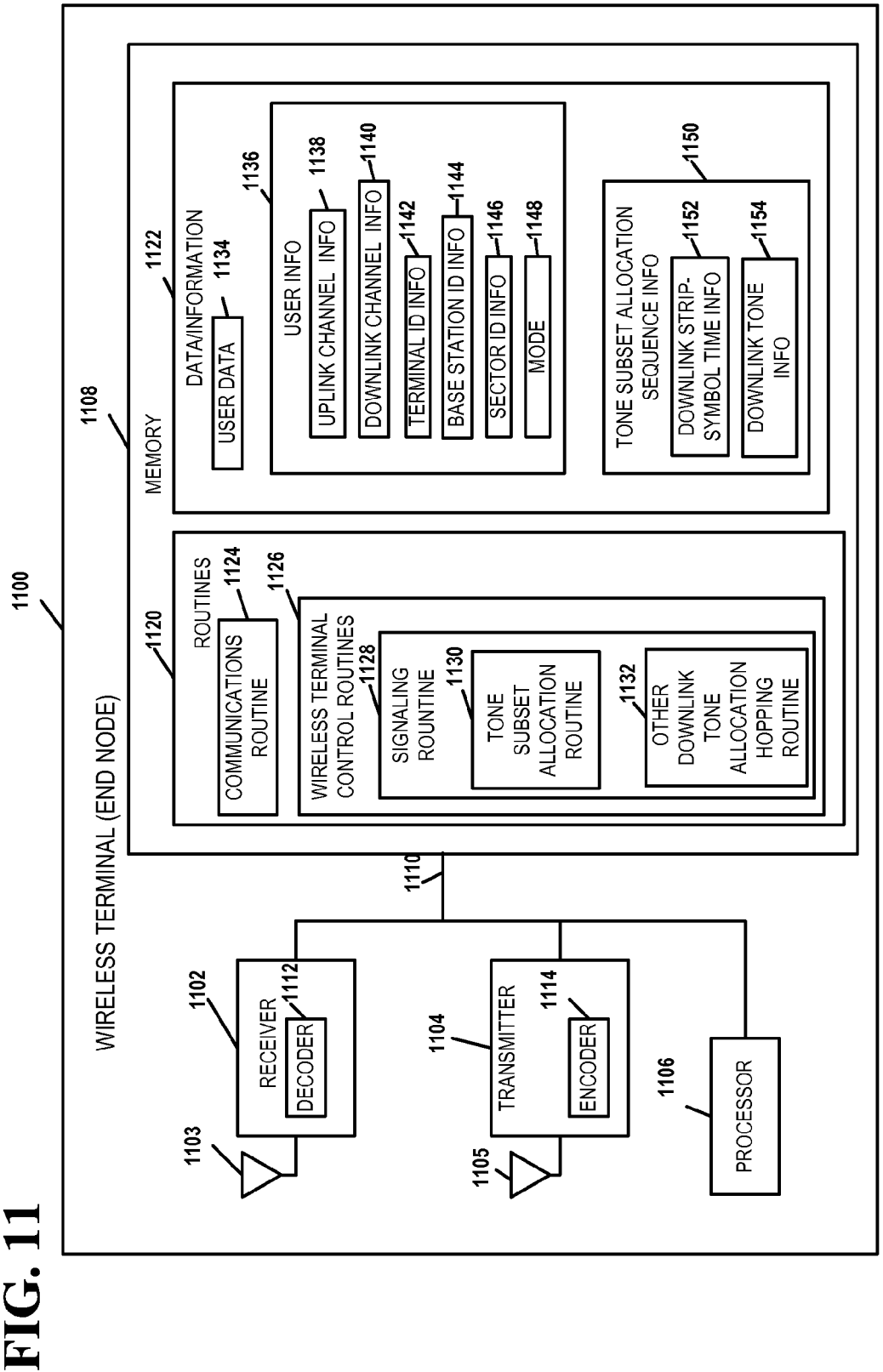
FIG. 11 is an illustration of an exemplary wireless terminal implemented in accordance with various aspects described herein.

FIG. 11 illustrates an example wireless terminal (end node) 1100 which can be used as any one of the wireless terminals (end nodes), e.g., EN(1) 936, of the system 900 shown in FIG. 9. Wireless terminal 1100 implements the tone subset allocation sequences. The wireless terminal 1100 includes a receiver 1102 including a decoder 1112, a transmitter 1104 including an encoder 1114, a processor 1106, and memory 1108 which are coupled together by a bus 1110 over which the various elements 1102, 1104, 1106, 1108 can interchange data and information. An antenna 1103 used for receiving signals from a base station (and/or a disparate wireless terminal) is coupled to receiver 1102. An antenna 1105 used for transmitting signals, e.g., to a base station (and/or a disparate wireless terminal) is coupled to transmitter 1104.

The processor 1106, e.g., a CPU controls the operation of the wireless terminal 1100 and implements methods by executing routines 1120 and using data/information 1122 in memory 1108.

Data/information 1122 includes user data 1134, user information 1136, and tone subset allocation sequence information 1150. User data 1134 may include data, intended for a peer node, which will be routed to encoder 1114 for encoding prior to transmission by transmitter 1104 to a base station, and data received from the base station which has been processed by the decoder 1112 in receiver 1102. User information 1136 includes uplink channel information 1138, downlink channel information 1140, terminal ID information 1142, base station ID information 1144, sector ID information 1146, and mode information 1148. Uplink channel information 1138 includes information identifying uplink channels segments that have been assigned by a base station for wireless terminal 1100 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1140 includes information identifying downlink channel segments that have been assigned by a base station to WT 1100 for use when the base station is transmitting data/information to WT 1100. Downlink channels may include downlink traffic channels and assignment channels, each downlink channel including one or more logical tone, each logical tone following a downlink hopping sequence, which is synchronized between each sector of the cell.

User info 1136 also includes terminal ID information 1142, which is a base station-assigned identification, base station ID information 1144 which identifies the specific base station that WT has established communications with, and sector ID info 1146 which identifies the specific sector of the cell where WT 1100 is presently located. Base station ID 1144 provides a cell slope value and sector ID info 1146 provides a sector index type; the cell slope value and sector index type may be used to derive tone hopping sequences. Mode information 1148 also included in user info 1136 identifies whether the WT 1100 is in sleep mode, hold mode, or on mode.

Tone subset allocation sequence information 1150 includes downlink strip-symbol time information 1152 and downlink tone information 1154. Downlink strip-symbol time information 1152 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1154 includes information including a carrier frequency assigned to the base station, the number and frequency of tones, and the set of tone subsets to be allocated to the strip-symbol periods, and other cell and sector specific values such as slope, slope index and sector type.

Routines 1120 include communications routines 1124 and wireless terminal control routines 1126. Communications routines 1124 control the various communications protocols used by WT 1100. Wireless terminal control routines 1126 controls basic wireless terminal 1100 functionality including the control of the receiver 1102 and transmitter 1104. Wireless terminal control routines 1126 include the signaling routine 1128. The signaling routine 1128 includes a tone subset allocation routine 1130 for the strip-symbol periods and an other downlink tone allocation hopping routine 1132 for the rest of symbol periods, e.g., non strip-symbol periods. Tone subset allocation routine 1130 uses user data/info 1122 including downlink channel information 1140, base station ID info 1144, e.g., slope index and sector type, and downlink tone information 1154 in order to generate the downlink tone subset allocation sequences in accordance with some aspects and process received data transmitted from the base station. Other downlink tone allocation hopping routine 1130 constructs downlink tone hopping sequences, using information including downlink tone information 1154, and downlink channel information 1140, for the symbol periods other than the strip-symbol periods. Tone subset allocation routine 1130, when executed by processor 1106, is used to determine when and on which tones the wireless terminal 1100 is to receive one or more strip-symbol signals from the base station 1000. The uplink tone allocation hopping routine 1130 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method for facilitating decoding a communication received from a wireless terminal, the method comprising:
   receiving a plurality of encoded bits via a shared uplink channel;
   identifying a plurality of acknowledgment tones within the plurality of encoded bits;
   determining a plurality of log likelihood ratio values respectively corresponding to information bits within detected bits of the plurality of acknowledgment tones;
   ascertaining, as a function of the plurality of log likelihood ratio values, a correlation value based at least in part on a correlation between the detected bits and valid bits corresponding to any of a plurality of valid acknowledgment codewords; and
   comparing the correlation value to a threshold value to determine whether the plurality of acknowledgment tones includes information corresponding to a discontinuous transmission.

2. The method of claim 1, wherein:
   each of the information bits has a corresponding bit location, and
   the ascertaining further comprising ascertaining a plurality of sums respectively corresponding to a summation of log likelihood ratio values associated with a subset of the information bits having a common bit location, wherein the correlation value depends on the plurality of sums.

3. The method of claim 2, further comprising ascertaining an absolute value for each of the plurality of log likelihood ratio values, the comparing comprising comparing the correlation value to a sum of the absolute value for each of the plurality of log likelihood ratio values.

4. The method of claim 1, the ascertaining further comprising selecting the correlation value from a plurality of potential correlation values respectively associated with one of the plurality of valid acknowledgment codewords, wherein the correlation value is a maximum of the plurality of potential correlation values.

5. The method of claim 1, further comprising segmenting each of the plurality of acknowledgment tones into a plurality of segments, the ascertaining further being a function of a log likelihood ratio value ascertained for each of the plurality of segments.

6. The method of claim 5, wherein each of the plurality of segments has a corresponding segment location, the ascertaining further comprising ascertaining a plurality of sums respectively corresponding to a summation of log likelihood ratio values associated with a subset of the detected bits having a common segment location, the correlation value depending on the plurality of sums.

7. The method of claim 1, the receiving comprising receiving the plurality of encoded bits via a plurality of transmissions.

8. The method of claim 1, the ascertaining further comprising ascertaining a modulation order for each of the plurality of valid acknowledgment codewords, wherein the correlation value is a function of the modulation order for each of the plurality of valid acknowledgment codewords.

9. The method of claim 1, the ascertaining further comprising ascertaining an anticipated bit length for an acknowledgment indicator, wherein the correlation value is ascertained as a function of the anticipated bit length.

10. An apparatus for facilitating decoding a communication received from a wireless terminal, the apparatus comprising:
a memory; and
at least one processor coupled to the memory, the at least one processor configured:
to receive a plurality of encoded bits via a shared uplink channel, the plurality of encoded bits including a plurality of acknowledgment tones;
to determine a plurality of log likelihood ratio values respectively corresponding to information bits within detected bits of the plurality of acknowledgment tones;
to ascertain, as a function of the plurality of log likelihood ratio values, a correlation value based at least in part on a correlation between the detected bits and valid bits corresponding to any of a plurality of valid acknowledgment codewords; and
to compare the correlation value to a threshold value to detect a discontinuous transmission within the plurality of acknowledgment tones.

11. The apparatus of claim 10, wherein:
each of the information bits has a corresponding bit location, and
the at least one processor is further configured to ascertain a plurality of sums respectively corresponding to a summation of log likelihood ratio values associated with a subset of the information bits having a common bit location, the correlation value depending on the plurality of sums.

12. The apparatus of claim 11, wherein the at least one processor is further configured:
to ascertain an absolute value for each of the plurality of log likelihood ratio values, and
to compare the correlation value to a sum of the absolute value for each of the plurality of log likelihood ratio values to detect the discontinuous transmission.

13. The apparatus of claim 10, wherein:
the at least one processor is further configured to select the correlation value from a plurality of potential correlation values respectively associated with one of the plurality of valid acknowledgment codewords, and
the correlation value is a maximum of the plurality of potential correlation values.

14. The apparatus of claim 10, wherein the at least one processor is further configured:
to ascertain a log likelihood ratio value for each of the detected bits, the correlation component configured to segment each of the plurality of acknowledgment tones into a plurality of segments, each of the plurality of segments having a corresponding log likelihood ratio value, and
to ascertain the correlation value as a function of the corresponding log likelihood ratio value for each of the plurality of segments.

15. The apparatus of claim 14, wherein:
each of the plurality of segments has a corresponding segment location, and
the at least one processor is further configured:
to ascertain a plurality of sums respectively corresponding to a summation of log likelihood ratio values associated with a subset of the detected bits having a common segment location, and
to ascertain the correlation value based on the plurality of sums.

16. The apparatus of claim 10, wherein the at least one processor is further configured to transmit a control channel assignment to the wireless terminal.

17. The apparatus of claim 10, wherein the at least one processor is further configured:
to ascertain a modulation order for each of the plurality of valid acknowledgment codewords, and
to ascertain the correlation value as a function of the modulation order for each of the plurality of valid acknowledgment codewords.

18. The apparatus of claim 10, wherein the at least one processor is further configured:
to ascertain an anticipated bit length for an acknowledgment indicator, and
to ascertain the correlation value as a function of the anticipated bit length.

19. A computer program product for facilitating decoding a communication received from a wireless terminal, comprising:
a non-transitory computer-readable medium having program code recorded thereon, the program code comprising:
program code to receive a plurality of encoded bits via a shared uplink channel;
program code to identify a plurality of acknowledgment tones within the plurality of encoded bits;
program code to determine a plurality of log likelihood ratio values respectively corresponding to information bits within detected bits of the plurality of acknowledgment tones:
program code to ascertain, as a function of the plurality of log likelihood ratio values, a correlation value based at least in part on a correlation between the detected bits and valid bits corresponding to any of a plurality of valid acknowledgment codewords; and
program code to compare the correlation value to a threshold value to determine whether the plurality of acknowledgment tones includes information corresponding to a discontinuous transmission.

20. An apparatus for facilitating decoding a communication received from a wireless terminal, comprising:
means for receiving a plurality of encoded bits via a shared uplink channel;
means for identifying a plurality of acknowledgment tones within the plurality of encoded bits;
means for determining a plurality of log likelihood ratio values respectively corresponding to information bits within detected bits of the plurality of acknowledgment tones
means for ascertaining, as a function of the plurality of log likelihood ratio values, a correlation value based at least in part on a correlation between the detected bits and valid bits corresponding to any of a plurality of valid acknowledgment codewords; and
means for comparing the correlation value to a threshold value to determine whether the plurality of acknowledgment tones includes information corresponding to a discontinuous transmission.

* * * * *